United States Patent [19]

Roberts et al.

[11] 4,377,504

[45] Mar. 22, 1983

[54] CRACKING CATALYST IMPROVEMENT WITH GALLIUM COMPOUNDS

[75] Inventors: John S. Roberts; Dwight L. McKay; Brent J. Bertus, all of Bartlesville, Okla.

[73] Assignee: Phillips Petroleum Company, Bartlesville, Okla.

[21] Appl. No.: 259,390

[22] Filed: May 1, 1981

[51] Int. Cl.³ .................... B01J 29/06; B01J 21/12; B01J 23/08
[52] U.S. Cl. .................................................. 252/455 Z
[58] Field of Search .................. 252/455 Z; 208/120

[56] References Cited

U.S. PATENT DOCUMENTS

| | | | |
|---|---|---|---|
| 2,901,419 | 8/1959 | Brill | 208/119 |
| 3,242,069 | 3/1966 | Gladrow et al. | 208/120 |
| 3,297,565 | 1/1967 | Garwood et al. | 208/217 |
| 3,926,781 | 12/1975 | Gale | 208/117 |
| 4,025,458 | 5/1977 | McKay | 252/416 |
| 4,111,845 | 9/1978 | McKay | 252/455 Z |
| 4,175,057 | 11/1979 | Davies et al. | 252/455 |
| 4,238,367 | 12/1980 | Bertus et al. | 252/455 Z |

FOREIGN PATENT DOCUMENTS 1533169  11/1978  United Kingdom .

*Primary Examiner*—Carl F. Dees

[57] ABSTRACT

Gallium compounds are usefully employed to modify hydrocarbon cracking catalysts.

9 Claims, No Drawings

CRACKING CATALYST IMPROVEMENT WITH GALLIUM COMPOUNDS

BACKGROUND OF THE INVENTION

The present invention relates to catalysts. In another aspect, the present invention relates to hydrocarbon cracking catalysts. In still another aspect, the invention relates to restoring the selectivity of hydrocarbon cracking catalysts. in yet another aspect, the invention relates to cracking a hydrocarbon feedstock.

Contaminants, for example, nickel, vanadium, and iron are found in significant concentrations in hydrocarbon feedstocks such as, for example, heavy oil fractions and in lower quality crude oils. These contaminants have a detrimental effect on the catalysts employed to convert these oils into gasoline and other valuable petroleum products, making processing of these oils economically unattractive. Unfortunately, because of limited supplies of oils containing low levels of contaminants, it is necessary to employ metals contaminated oils in hydrocarbon processes, such as catalytic cracking processes.

The contaminants found in feedstocks to cracking processes become deposited on the cracking catalyst. The deposition on the catalyst of, for example, nickel, vanadium and iron, causes a decrease in the activity of the cracking catalyst to convert the hydrocarbon feedstock into cracked products, including gasoline. The selectivity of the cracking catalyst for cracking the feedstock into gasoline as manifested by the portion of cracked products comprising gasoline is also decreased. The production of undesirable products, for example, hydrogen and methane, which must be compressed, necessitating additional equipment; and coke, which is deposited on the catalyst and must be burned off, requiring additional equipment and "off time", during which the catalyst is not employed for cracking, is significantly increased.

Because of these problems, the industry often replaces cracking catalysts contaminated by more than about 3,000 parts per million (ppm) of vanadium equivalents and iron. As used herein, the term vanadium equivalents is the measure of the combined parts by weight of vanadium and four times the nickel per million parts by weight of cracking catalyst including the weight of nickel, vanadium and iron on the cracking catalyst. There is thus a need for a cracking process suitable for use with contaminated feedstocks and contaminated cracking catalysts. There is also a need for a cracking catalyst which avoids at least some of the detrimental effects caused by deposits thereon of contaminants selected from nickel, vanadium and iron. There is also a need for a process of treating a contaminated cracking catalyst to increase its selectivity for producing gasoline boiling range type products.

OBJECTS OF THE INVENTION

It is thus an object of the present invention to provide a method for restoring the selectivity of a contaminated cracking catalyst.

It is a further object of this invention to provide an improved cracking catalyst wherein decreased catalyst selectivity caused by contaminants such as nickel, vanadium and iron on the cracking catalyst is mitigated.

It is another object of this invention to provide a process for cracking hydrocarbons wherein the deleterious effects caused by metals on the cracking catalyst are at least mitigated.

These and other objects of the present invention will be more fully explained in the following detailed disclosure of the invention and the appended claims.

SUMMARY OF THE INVENTION

In accordance with the present invention, a catalyst composition comprises a zeolite-modified cracking catalyst having deposited thereon a treating agent selected from gallium and a compound of gallium.

Further, according to the invention, a contaminated cracking catalyst previously employed for the catalytic cracking of hydrocarbons is improved by contacting the cracking catalyst with gallium or a compound thereof.

Still further in accordance with the invention, a hydrocarbon feedstock is catalytically cracked employing the above described catalyst composition.

DETAILED DESCRIPTION OF THE INVENTION

It has been discovered that the adverse effects of nickel, vanadium and iron on a cracking catalyst can be mitigated by contacting the cracking catalyst with a treating agent selected from gallium and gallium compounds. The treating agent can be selected from most any source of gallium such as elemental gallium, inorganic gallium compounds, and organic gallium compounds. Suitable inorganic gallium compounds include salts, for example, gallium nitrate, gallium sulfate, gallium oxide, gallium hydroxide, gallium phosphide, gallium nitride, gallium sulfide, gallium selenide, sodium gallate, calcium gallate, gallium antimonide, or gallium compounds that have the empirical formula $GaM(SO_4)_2$, where M is $NH_4^+$ or a member of Group IA of the periodic table, as found at page 83 of the Handbook of Chemistry and Physics, 54th edition (1973–74), published by the Chemical Rubber Company Press, Cleveland Ohio. Less preferred, because of the corrosive effect of halogens on process equipment, are halogen-containing gallium salts, for example, $GX_3$ or $Ga(XO_3)_3$, where X is selected from the group Cl, Br and I, Suitable organic compounds can be represented generally by the formula $GaR_3$ wherein R is an organic moiety. Included within this group are the salts of carboxylic acids, $(R'COO)_3Ga$ wherein R' is hydrogen or a hydrocarbyl radical having from 1 to about 20 carbon atoms. Examples of suitable carboxyl compounds include gallium formate, gallium acetate, gallium propionate, gallium butyrate, gallium decanoate, gallium stearate, gallium citrate, gallium lactate, gallium malate, gallium oxalate, and the like. Polybasic carboxylates, such as gallium citrate, gallium malonate, and gallium oxalate can also be utilized. Other suitable organic compounds are for example, gallium tris(hydrocarbyl oxide)s—$Ga(OR'')_3$—wherein R' preferably contains one to about 20 carbon atoms and can be an alkyl, alkenyl, cycloalkyl, or aryl radical, or a combination of radicals such as alkaryl, aralkyl, alkylcycloalkyl, and the like. Examples of suitable oxyhydrocarbyl compounds are gallium methoxide, gallium isopropoxide, gallium tert-butoxide, gallium phenoxide, gallium decyloxide, and the like. Other suitable organic compounds are for example, gallium alkyls—$GaR'''_3$—where R''' can be an alkyl group containing 1-20 carbon atoms, preferably 1-5 carbon atoms. Examples of suitable hydrocarbyl compounds are triethylgallium, tributylgallium, diethylpentylgallium, and the like. It is recognized that these compounds are pyrophoric and must be treated accordingly, R', R", and R'" can be substituted with, for example, halogen, sulfur, phosphorus or nitrogen. For example, sulfur containing compounds such as gallium dialkyldithio-carbarnates and gallium xanthates are suitable. Also, gallium compounds containing both phosphorus and sulfur, for example, gallium dihydrocarbyl dithiophosphates, such as those represented by the formula Ga[S$_2$P (OR'")$_2$]$_3$ wherein R'" is as defined before, are suitable. Of course, mixtures of any of the above compounds may be utilized. The gallium containing treating agent of this invention can also be utilized in combination with other passivating agents, for example, passivating agents containing elements selected from Groups IVA, VA and VIA of the Periodic Table, preferably antimony.

Generally, the amount of gallium containing treating agent contacted with the cracking catalyst is a "passivating amount". By passivating amount is meant an amount of treating agent which is sufficient to mitigate at least one of the deleterious effects caused by deposition on the cracking catalyst of at least one contaminant selected from the group of nickel, vanadium and iron, such as, for example, decreased catalyst selectivity for gasoline production.

Although not intending to be bound to any particular theory of operation, it is believed that the decomposition products of the gallium containing treating agent react with the contaminants present on the cracking catalyst in such a way as to decrease the activity of the contaminants for detrimentally affecting the cracking process. It is therefore believed that an effect of the contact between the cracking catalyst and a passivating amount of gallium containing treating agent is an increase in the gallium concentration of the cracking catalyst. However, for many applications, the increased gallium concentration in the cracking catalyst may be too small to measure.

Generally, a sufficient amount of the gallium-containing treating agent is contacted with the cracking catalyst to impart to the cracking catalyst a concentration of added gallium of between about 1 and about 100,000 parts per million (0.0001 to 10 weight percent) by weight of cracking catalyst after treatment. Where a gallium-containing cracking catalyst is treated, the added gallium will be manifested as an increased gallium concentration in the cracking catalyst. It is preferred to contact the cracking catalyst with a sufficient amount of gallium-containing treating agent to impart to the cracking catalyst a concentration of added gallium of between about 10 and about 10,000 parts per million by weight (0.001 to 1 wt percent) of cracking catalyst after treatment, more preferably from about 100 to about 2,500 parts per million (0.01 to 0.25 wt percent) because treated cracking catalysts have concentrations of added gallium within this range have been tested with good results.

Generally, the amount of gallium added to the cracking catalyst should be an amount sufficient to impart to the cracking catalyst a ratio of weight of added gallium to vanadium equivalents on the cracking catalysts of between about 1:1,000 to about 5,000:1,000. More preferably, the added gallium is in an amount sufficient to impart to the cracking catalyst a ratio of weight of added gallium to vanadium equivalents on the cracking catalyst of between 5:1,000 to 500:1,000. More preferably, the added gallium is in an amount sufficient to impart to the cracking catalyst a ratio of weight of added gallium to vanadium equivalents of between about 20:1,000 to about 200:1,000, because treated cracking catalysts having weight added gallium:- vanadium equivalents ratios within this range have been tested with good results.

The present invention has particular utility for improving the cracking characteristics of cracking catalysts having deposited thereon 3,000 ppm and greater of vanadium equivalents. Untreated cracking catalysts have usually developed undesirable cracking behavior at a contamination level of 3,000 vanadium equivalents. Treatment of the cracking catalyst in accordance with the present invention is effective to mitigate the undesirable behavior of cracking catalysts having deposited thereon 3,000 ppm vanadium equivalents, 10,000 ppm vanadium equivalents and even 20,000–50,000 vanadium equivalents and beyond of contaminants.

Any suitable method can be used to contact the treating agent with the catalyst. It can be mixed with the catalyst as a finely divided solid and dispersed by rolling, shaking, stirring, etc. Or, it can be dissolved in a suitable solvent, aqueous or organic, and the resulting solution used to impregnate the cracking catalyst—followed by drying to remove the solvent. Or, it can be sprayed on the catalyst, such as by being dissolved or suspended in the feedstock to a catalyst cracking unit.

The time required to effect a contact between the treating agent and cracking catalyst is not particularly important. Generally, for a batch treatment outside of a catalytic cracker such time period can range from 0 to 30 minutes. Likewise, the temperature at which the contact is effected can be selected from a wide range of values, depending, for example, on whether the treating agent is contacted with the cracking catalyst as a vapor or as in solution with a relatively low boiling solvent.

The cracking catalysts which can be advantageously treated in accordance with the above-described process are generally any of those cracking catalysts employed for the catalytic cracking of hydrocarbons boiling above 400° F. (204° C.) in the absence of added hydrogen which have become partially deactivated by deposits of contaminating metals thereon. Treatment of such contaminated cracking catalysts in the above-described manner produces the modified cracking catalyst of the present invention. These cracking catalysts generally contain silica or silica alumina and are frequently and preferably associated with zeolitic materials. Generally, from 1 to 40 percent, usually from about 2 to about 10 percent by weight of the catalyst will comprise crystalline zeolitic materials. The zeolitic materials can be naturally occurring or synthetic, and such materials can be produced by ion exchange methods and provided with metallic ions which improve the activity of the catalyst. Zeolite-modified silica alumina catalysts are particularly applicable to this invention because of their high activity and selectivity. Examples of metals contaminated cracking catalysts into or onto which a source of gallium can be incorporated include hydrocarbon cracking catalysts obtained by admixing an inorganic oxide gel with an aluminosilicate, and aluminosilicate compositions which are strongly acidic as the result of treatment with a fluid medium containing at least one rare earth metal cation and a hydrogen ion, or ion capable of conversion to a hydrogen ion.

It is inherent in this invention that the treated cracking catalyst will be subjected to elevated temperatures. When utilized in a continuous cracking process, the treated cracking catalyst can be subjected to temperatures between 800° F. (427° C.) and 1200° F. (649° C.) in the cracking zone and temperatures between 1000° F. (538° C.) and 1500° F. (816° C.) in the regeneration zone. Generally free oxygen containing gas is present in the regeneration zone. The contacting of the treating agent with the cracking catalyst can occur in the cracking zone, in the regeneration zone, or in the catalyst stream between the two zones.

A further embodiment of the present invention is directed to a catalytic cracking process wherein a hydrocarbon feedstock is contacted with the above-described modified cracking catalyst under cracking conditions to produce a cracked product. Such cracking operations are generally carried out at temperatures between 800° F. (427° C.) and about 1200° F. (649° C.) at pressures within the range of subatmospheric to several hundred atmospheres. A preferred example of this embodiment of the invention utilizes a cyclic flow of catalyst between a fluidized cracking zone and a regeneration zone in a cracking reactor. Generally, the cracking catalyst is in particulate form and has a size within the range of from about 10 to 100 microns, preferably about 60 microns, where fluidized bed cracking is utilized. Generally, a hydrocarbon feedstock is introduced into a cracking zone under cracking conditions including the absence of added hydrogen and contacted with the above described modified cracking catalyst to produce an effluent containing cracked product and cracking catalyst having coke deposits thereon. The cracked products and unreacted feedstock are separated from the cracking catalyst, and the cracking catalyst is regenerated by contact with oxygen-containing gas under regeneration conditions to remove at least a portion of the coke from the cracking catalyst by combustion usually in a regeneration zone apart from the cracking zone. The thus regenerated cracking catalyst can then be recycled back to the cracking zone usually with supplementation by make-up catalyst for the cracking of additional hydrocarbon feedstock. Such a system is well known to those skilled in the art.

Specific conditions in the cracking zone and the regeneration zone of a fluid catalytic cracker depend on the feedstock used, the condition of the catalyst, and the products sought. In general, conditions in the cracking zone include:

TABLE I

| | |
|---|---|
| Temperature: | 427–649° C. (800–1200° F.), preferably 482–538° C. |
| Contact time: | 1–40 seconds, preferably 1–10 seconds |
| Pressure: | 10 kiloPascals to 21 megaPascals (0.1 to 205 atm.) |
| Catalyst:oil ratio: | 3/1 to 30/1, by weight |

Conditions in the regeneration zone include:

TABLE II

| | |
|---|---|
| Temperature: | 538–816° C. (1000–1500°F.), preferably 620–677° C. |
| Contact time: | 2–40 minutes |
| Pressure: | 10 kiloPascals to 21 megaPascals (0.1 to 205 atm.) |
| Air rate (at 16° C., 100–250 ft$^3$/lb coke 1 atm.): | (6.2–15.6 m$^3$/kg coke) |

The feedstocks introduced into the catalytic cracking unit are generally oils having an initial boiling point of above 204° C., and an end boiling point which is frequently above 400° C. This includes gas oils, fuel oils, topped crude, shale oil and oils from coal and/or tar sands.

Such feedstocks can and usually do contain a significant concentration of at least one metal selected from vanadium, iron and nickel. Because these metals tend to be concentrated in the least volatile hydrocarbon fractions suitable for use as feedstocks, a process for cracking these heavy oil fractions is probably the most important embodiment of this invention. Currently, the industry obtains only economically marginal results when cracking feedstocks containing from about 50 to about 100 parts per million of total effective metals, where total effective metals is defined herein as the sum of the elemental weights of iron, vanadium and four times the weight of nickel in 1,000,000 parts by weight of feedstock, including the iron, vanadium and nickel contained therein. In accordance with the present invention, feedstocks containing 50–100 parts per million of total effective metals, and even those containing 100–200 parts per million of total effective metals and beyond can be economically cracked to produce gasoline and other light distillates. The quantity of added gallium required to passivate vanadium, iron and nickel is related directly to the concentration of these metals in the feedstock. In a preferred embodiment, the gallium containing treating agent is dissolved or suspended in a suitable solvent and introduced into the catalytic cracking unit along with the hydrocarbon feedstock. Generally, a sufficient amount of the gallium-containing treating agent will be introduced into the hydrocarbon feedstock so as to impart to the feedstock a concentration of gallium of between 1 and about 200 parts per million based on weight of feedstock entering the cracking zone. Usually, the concentration of gallium in the feedstock will be between about 5 and 50 parts per million by weight. It is advantageous to employ a concentration of gallium on the cracking catalyst in relationship to the contaminating metals concentration in the feedstock as shown by the following table.

TABLE III

| Total Effective Metals in Feedstock, ppm | Gallium Concentration on Catalyst, ppm |
|---|---|
| ≦40–100 | 10–1,000 |
| 100–200 | 25–2,500 |
| 200–300 | 50–5,000 |
| 300–800 | 100–10,000 |

In another aspect of the present invention, it has been found that a metals-contaminated cracking catalyst which has been improved by treatment with an antimony-containing treating agent is further improved by treatment with a gallium-containing treating agent, particularly as regards gasoline yield when the cracking catalyst is employed in the catalytic cracking of hydrocarbons. The benefit is observed even when very small amounts of gallium are used to promote the passivation effects attributable to treatment with the antimony-containing treating agent. Thus, the present invention includes within its scope cracking catalyst compositions having deposited thereon both of an antimony-containing and a gallium-containing treating agent. Usually, the cracking catalyst will have an antimony concentration of between about 0.01 to about 1 percent by weight, preferably from about 0.05 to about 0.5 percent by weight. Usually, the cracking catalyst will have a concentration of gallium of from about 0.001 to about 0.25 percent by weight. Usually, the gallium and antimony are employed on the catalyst at elemental weight ratios of from about 1:1,000 to about 1000:1 preferably at a weight ratio of from about 1:500 to about 5:1, and most preferably at a weight ratio of from about 1:100 to about 1:1, because good results have been obtained by treating the cracking catalyst with each of a gallium-containing treating agent and an antimony-containing treating agent to impart to the cracking catalyst weight (elemental) concentrations of gallium and antimony which fall within the most preferred ratio. Similarly, a cracking process in which an antimony-containing treating agent is introduced into the cracking zone together with the cracking catalyst, such as in admixture with the hydrocarbon feedstock, is improved by the introduction of gallium-containing treating agent into the cracking zone.

The invention is illustrated by the following examples.

EXAMPLE I

Preparation of gallium diethyldithiocarbamate. This compound was prepared by a double decomposition reaction between gallium chloride and potassium diethyldithiocarbamate. The former was purchased from a chemical supply house; the latter was synthesized as follows: to 43.0 g (0.769 moles) of potassium hydroxide and 56.3 g (0.769 moles) of diethylamine in a flask, 59.9 g (0.786 moles) of carbon disulfide was dropped dropwise while the flask was cooled in ice water. A solid product was formed from the combination of these reactants. It was dissolved in about 100 mL of tetrahydrofuran (THF), heated to the boiling point of THF, then cooled in ice water and solvent was removed by filtration. The nearly white crystalline product was washed with diethyl ether. When dry the resulting potassium diethyldithiocarbamate weighed 137.4 g. A solution containing 25.1 g (0.134 moles) of it in about 100 mL of THF was added to a cooled solution that contained 7.84 g (0.0445 moles) of gallium chloride in about 200 mL of THF. This mixture was refluxed for five hours, cooled, filtered, and the solid recrystallized from THF and n-hexane. Its composition, calculated as $[(C_2H_5)_2NCS_2]_3Ga$, is 35.01 percent C, 5.89 percent H, 8.17 percent N, and 13.55 percent Ga; chemical analyses showed 35.79 percent C, 5.91 percent H, 8.29 percent N, and 6.9 percent Ga. The reason for the low concentration of gallium is not known. However, the concentration determined by the actual analysis provided the basis for calculating the quantity that was added to treat a cracking catalyst.

EXAMPLE II

Preparation of modified catalysts. Samples of a commercial cracking catalyst (catalyst 0) that had been used in a commercial catalytic cracker until it had attained equilibrium composition with respect to metals accumulation (catalyst was being removed from the process system at a constant rate) were modified by treatment with gallium. The catalyst, being a synthetic zeolite combined with amorphous silica/alumina was predominantly silica and alumina. Concentrations of other elements together with pertinent physical properties are shown in Table IV.

TABLE IV

| Surface area | 74.3 m²/g |
| --- | --- |
| Pore volume | 0.29 ml/g |
| Composition | |
| Nickel | 0.38 weight percent |
| Vanadium | 0.60 |
| Iron | 0.90 |

TABLE IV-continued

| Cerium | 0.40 |
| --- | --- |
| Sodium | 0.39 |
| Carbon | 0.06 |

The catalyst contains 21,200 ppm vanadium equivalents of contaminants, i.e. combined parts by weight of vanadium and four times the nickel per million parts by weight of cracking catalyst, including the weight of nickel, vanadium and iron on the cracking catalyst.

Catalyst A was prepared by adding 0.108 g of powdered gallium oxide to 80 g of equilibrium cracking catalyst and mixed by shaking in a jar for 10 minutes. This catalyst contained 0.10 weight percent gallium.

Catalyst B was prepared by adding 0.040 g of antimony as antimony tris(O,O-di-n-propylphosphorodithioate) to 40 g of catalyst A. Fifty mL of dry cyclohexane was added to dissolve the antimony compound and facilitate its distribution over the catalyst. After stirring the mixture was heated until the solvent was evaporated. This catalyst contained 0.1 weight percent of gallium and 0.1 weight percent of antimony.

Catalyst C was prepared by adding to 40 g of equilibrium cracking catalyst 40 mL of toluene in which was dissolved 0.0295 g of the gallium compound from example 1 and 0.040 g of antimony as antimony tris(O,O-di-n-propylphosphorodithioate). After thorough mixing solvent was removed by warming on a hot plate leaving a free flowing powder. This catalyst contained 0.005 weight percent gallium and 0.1 weight percent antimony.

Catalyst D was prepared in the same way as Catalyst C but without any added gallium—it contained 0.1 weight percent antimony.

Before being used Catalysts A, B, C, and D were aged by subjecting them separately to the following treatment. The catalyst, in a quartz reactor, was fluidized with nitrogen while being heated to 482° C., then it was fluidized with hydrogen while the temperature was raised from 482° to 649° C. Maintaining that temperature, fluidization continued for 5 minutes with nitrogen, then for 15 minutes with air. The catalyst was cooled to about 482° C., still being fluidized with air. The catalyst was then aged through 10 cycles, each cycle being conducted in the following manner. The catalyst at about 482° C. was fluidized with nitrogen for one minute, then heated to 510° C. during two minutes while fluidized with hydrogen, then maintained at about 510° C. for one minute while fluidized with nitrogen, then heated to about 649° C. for 10 to 94 minutes while fluidized with air, and then cooled to about 482° C. during 0.5 to 1 minute while fluidized with air. After 10 such cycles it was cooled to ambient temperature while being fluidized with nitrogen, and was used in a run to crack gas oil.

EXAMPLE III

Catalysts A, B, C, and D were used in a fluidized bed reactor to crack a gas oil. The cracking reaction was carried out at 510° C. and atmospheric pressure for 0.5 minute; regeneration was at about 649° C., also at atmospheric pressure. The reactor was purged with nitrogen before and after each cracking step.

Properties of the gas oil used as feedstock for the cracking runs are summarized in Table V.

TABLE V

| | |
|---|---|
| API gravity at 15.6° C. | 25.8° |
| BMCI | 41.1 |
| Carbon residue | 0.87 weight percent |
| Sulfur | 0.40 weight percent |
| Nitrogen | 0.07 weight percent |
| Distillation (by ASTM D 1160-77) | |
| 2 percent | 498° F. |
| 10 | 566 |
| 20 | 621 |
| 30 | 669 |
| 50 | 759 |
| 70 | 842 |
| 90 | 973 |
| 95 | 1047 |

Results of the cracking runs are tabulated in Table VI.

TABLE VI

| | | | | | | Yields | | Gasoline Selectively, |
|---|---|---|---|---|---|---|---|---|
| Run # | Catalyst | Additive (Elemental Wt. %) | Catalyst:Oil Weight Ratio | Conversion, Vol. % of Feed | Coke, Wt % of Feed | SCF $H_2$/bbl. Feed Conv. | Gasoline, Vol. % of Feed | Vol. % of Conversion |
| 1 | O | None | 7.7 | 64.5 | 8.7 | 635 | 51.7 | 80.2 |
| 2 | A | 0.1 Ga$^1$ | 7.67 | 61.8 | 9.1 | 660 | 55.4 | 89.6 |
| 3 | A | 0.1 Ga$^1$ | 7.7 | 60.3 | 8.1 | 690 | 53.8 | 89.2 |
| 4 | B | 0.1 Ga$^1$ + 0.1 Sb$^2$ | 7.7 | 64.0 | 7.8 | 521 | 58.5 | 91.4 |
| 5 | B | 0.1 Ga$^1$ + 0.1 Sb$^2$ | 7.67 | 66.8 | 8.0 | 452 | 58.6 | 87.7 |
| 6 | C | 0.005 Ga$^3$ + 0.1 Sb$^2$ | 7.55 | 62.8 | 7.4 | 387 | 58.6 | 93.3 |
| 7 | C | 0.005 Ga$^3$ + 0.1 Sb$^2$ | 7.56 | 63.9 | 6.6 | 355 | 58.8 | 92.0 |
| 8 | D | 0.1 Sb$^2$ | 7.7 | 64.5 | 6.0 | 410 | 54.8 | 85.0 |

$^1$via admixing with powdered gallium oxide
$^2$via impregnation with antimony tris(0,0-di-n-propylphosphorodithioate)
$^3$via impregnation with gallium diethyldithiocarbamate Comparison of the results from the average of two runs with Catalyst A with those from untreated Catalyst O show that at these conditions Catalyst A produced a 5.6 percent higher yield of gasoline. Similarly, comparison of the results from the average of two runs with Catalyst B with those from Catalyst D show that the addition of 0.1 weight percent gallium to the catalyst that already bears 0.1 weight percent antimony increases the yield of gasoline by 6.7 percent. And comparison of the results from the average of two runs with Catalyst C with those from Catalyst D show that the addition of 0.005 weight percent gallium to the catalyst that already bears 0.1 weight percent antimony increases the yield of gasoline by 7.1 percent.

The data from Table VI show certain unexpected results from treating the catalyst with antimony and gallium combined. For example, the addition of 0.1 wt% Sb to a catalyst containing 0.1 wt% Ga caused, at about a constant catalyst/oil ratio, an increase in conversion (activity) of about 3.6% (cf run 2 to run 4). Addition of 0.1 wt% of Sb to an equilibrium catalyst not containing Ga did not effect conversion to a large extent (cf run 1 to run 8). The addition of 0.005 wt% Ga to an equilibrium catalyst containing 0.1 wt% Sb caused a reduction in hydrogen yield by about 5.6% (cf run 6 with run 8). The addition of 0.1 wt% Ga to an equilibrium catalyst not containing Sb caused an increase in hydrogen yield of about 3.9% (cf run 2 with run 1).

What is claimed is:

1. A composition comprising a zeolite modified hydrocarbon cracking catalyst containing from about 60 to about 99 percent by weight of amorphous silica alumina matrix and from about 1 to about 40 percent by weight of crystalline zeolitic material dispersed within the matrix and having deposited thereon a treating agent selected from the group consisting of gallium and a compound of gallium in an amount sufficient enough to impart to the composition a concentration of gallium of about 0.001 to about 1 percent by weight.

2. A composition as in claim 1 which comprises from about 2 to about 10 percent by weight of crystalline zeolitic material.

3. A composition as in claim 2 which has a particle size within the range of from about 10 to about 100 microns.

4. A composition as in claim 3 further comprising from about 3,000 to about 50,000 parts per million by weight of vanadium equivalents of nickel and vanadium deposited on the matrix and zeolitic material.

5. A composition as in claim 4 further comprising from about 0.01 to about 1 percent by weight of antimony expressed as the element deposited on the matrix and zeolitic material.

6. A composition as in claim 5 comprising from about 10,000 to about 50,000 parts per million by weight of vanadium equivalents of nickel and vanadium deposited on the matrix and zeolitic material.

7. A composition as in claim 6 comprising from about 0.01 to about 0.25 weight percent of gallium deposited on the matrix and on zeolitic material.

8. A composition as in claim 7 comprising from about 0.05 to about 0.5 percent by weight of antimony expressed as the element deposited on the matrix and zeolitic material.

9. A composition as in claim 8 comprising from about 0.01 to about 0.1 percent by weight of gallium deposited on the matrix and on the zeolitic material.

* * * * *

UNITED STATES PATENT AND TRADEMARK OFFICE
CERTIFICATE OF CORRECTION

PATENT NO. : 4377504

DATED : March 22, 1983

INVENTOR(S) : John S. Roberts et al.

It is certified that error appears in the above-identified patent and that said Letters Patent is hereby corrected as shown below:

Claim 7, column 10, line 49, "0.01" should be ---0.001---.

Signed and Sealed this

Twenty-first Day of October, 1986

[SEAL]

*Attest:*

DONALD J. QUIGG

*Attesting Officer*     *Commissioner of Patents and Trademarks*